Dec. 5, 1933.   B. LEVY ET AL   1,937,900
VEHICLE AND THE LIKE
Filed Sept. 2, 1932   3 Sheets-Sheet 1
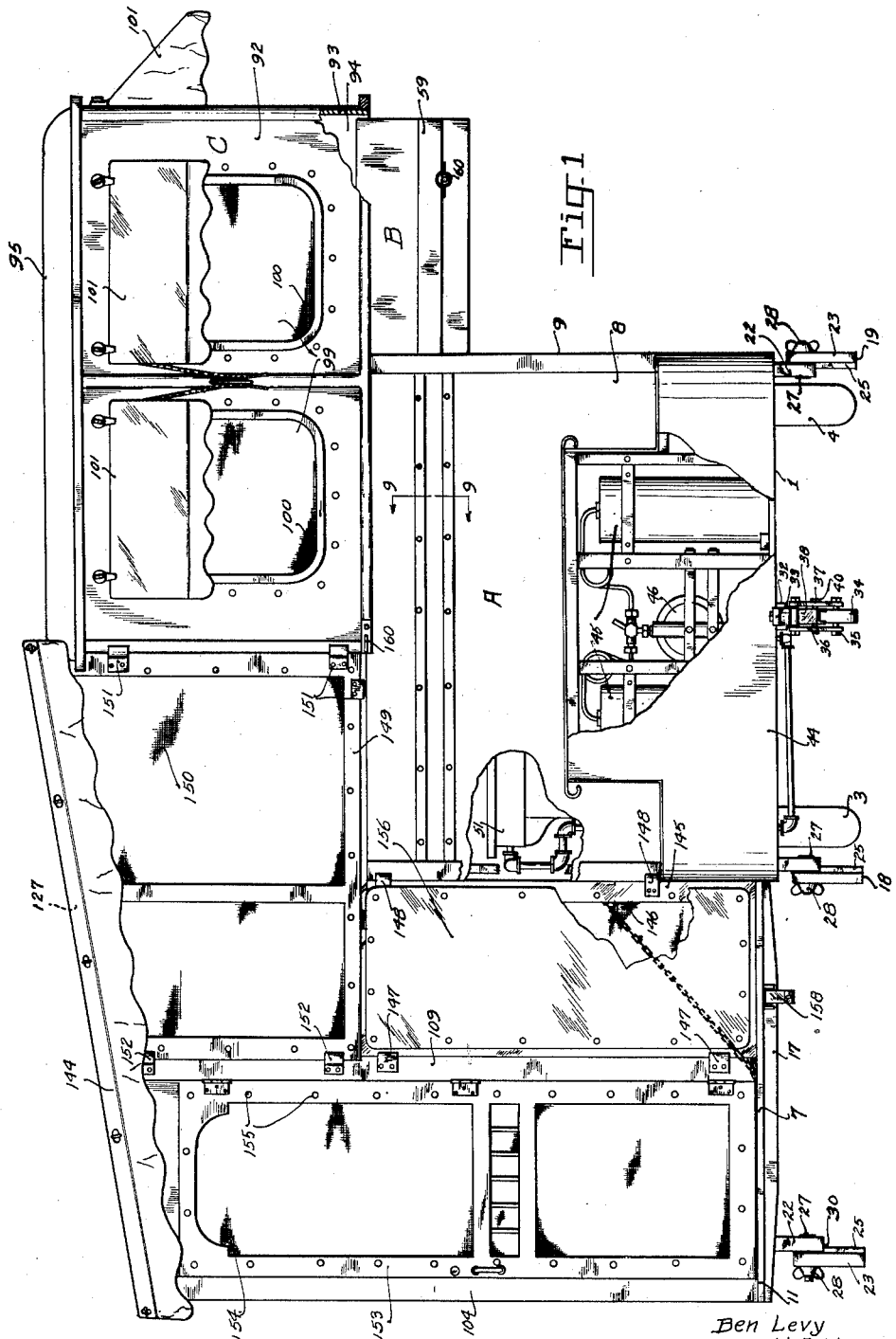
Ben Levy
Harold J. Hanson
Inventors
Samuel S. Jacobson
Attorney Dec. 5, 1933.  B. LEVY ET AL  1,937,900
VEHICLE AND THE LIKE
Filed Sept. 2, 1932   3 Sheets-Sheet 2
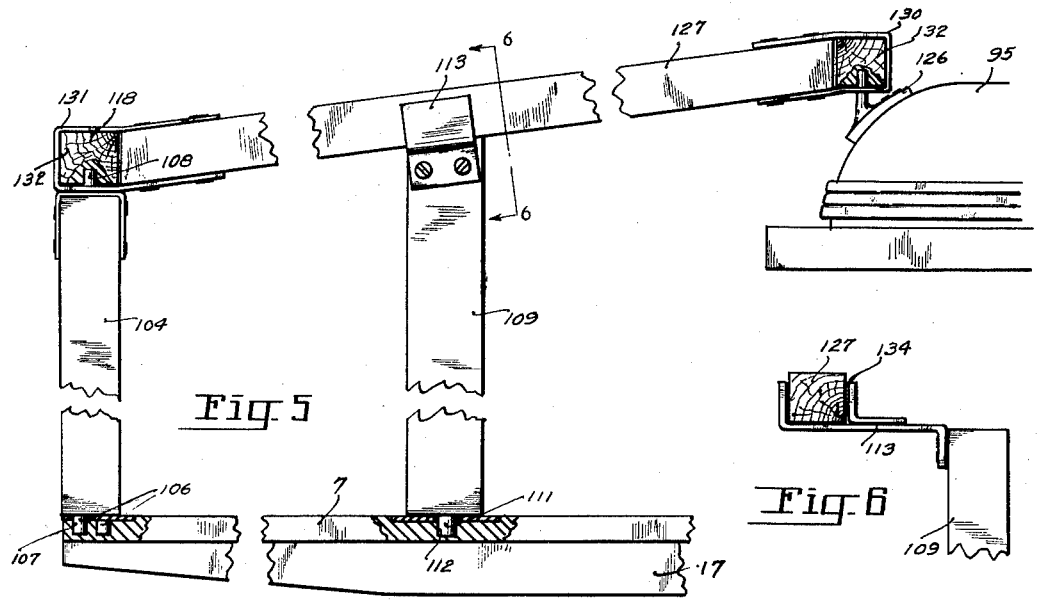
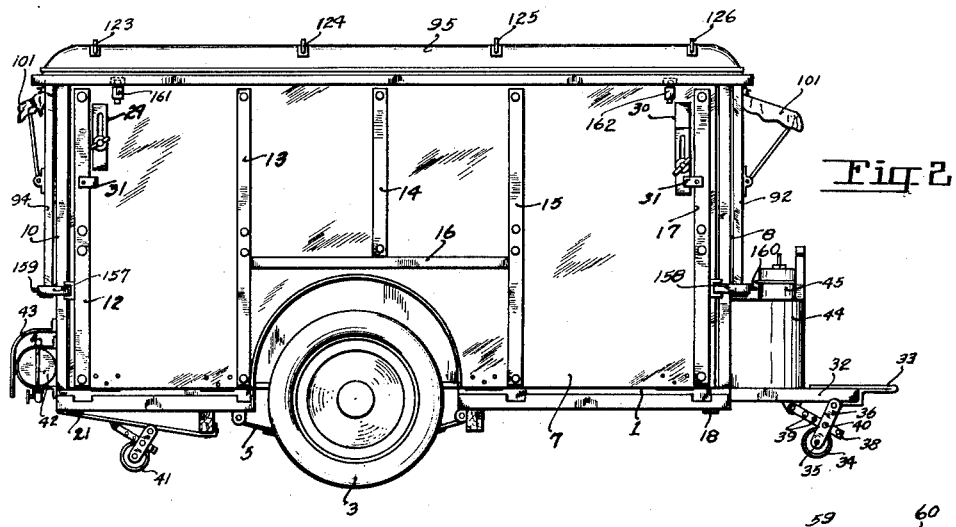
Ben Levy
Harold J. Hanson
Inventors
Samuel S. Jacobson
Attorney Dec. 5, 1933. B. LEVY ET AL 1,937,900
VEHICLE AND THE LIKE
Filed Sept. 2, 1932 3 Sheets-Sheet 3
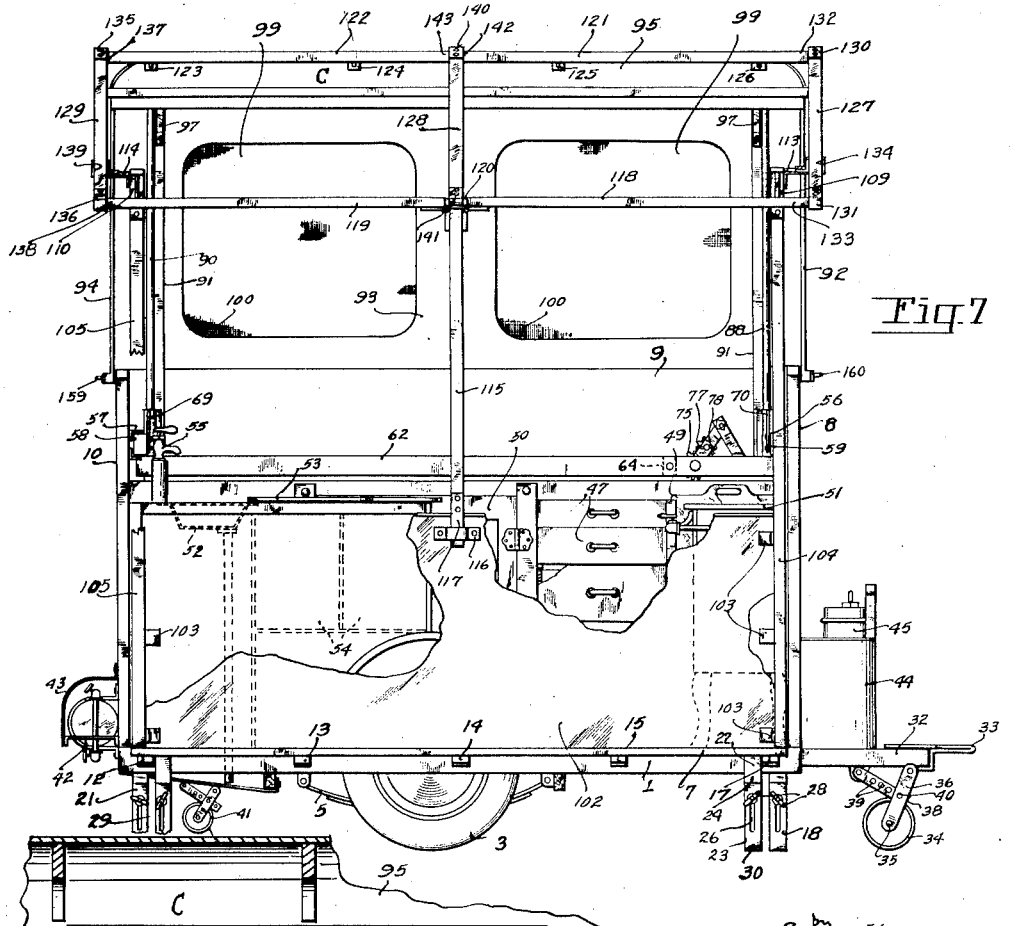
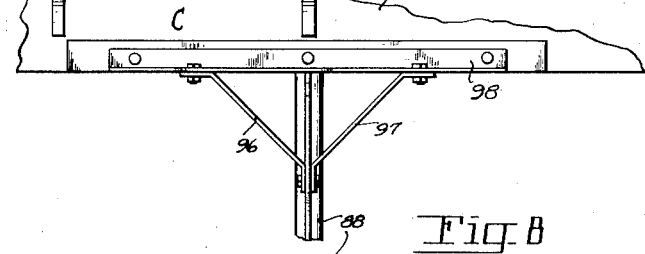
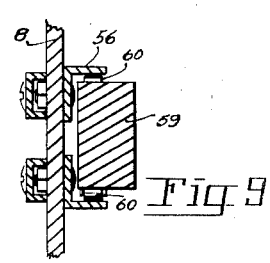
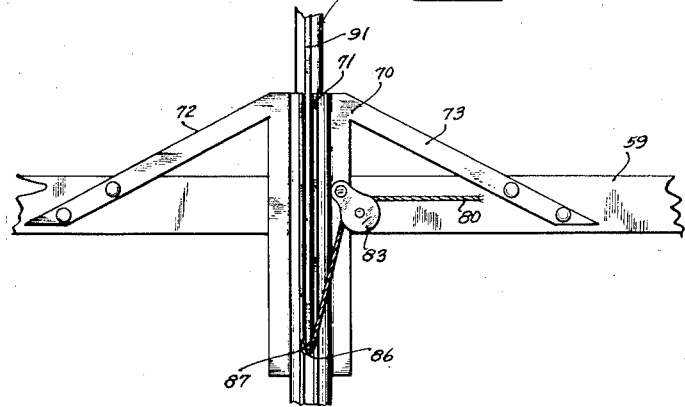
Inventors
Ben Levy
Harold J. Hanson
Samuel S. Jacobson
Attorney Patented Dec. 5, 1933

1,937,900

UNITED STATES PATENT OFFICE 1,937,900

VEHICLE AND THE LIKE

Ben Levy and Harold J. Hanson, Portland, Oreg.

Application September 2, 1932. Serial No. 631,538

4 Claims. (Cl. 296—23)

This invention relates to a vehicle, attachments and accessories therefor whereby the said vehicle can be converted into living quarters when stationary and contracted into a compact form for traveling. Generally, our invention comprises a lower-main-body-frame which is attached to the running gear, a bed-frame which is slidably disposed relative to the lower-main-body-frame and an upper-main-body-frame which is raised and lowered relative to the lower-main-body-frame and the bed-frame. When the vehicle is ready for travel, the bed-frame is aligned with the lower-main-body-frame and the upper-main-body-frame is lowered over the lower-main-body-frame and bed-frame; and when the vehicle is arranged for occupancy, the upper-main-body-frame is raised, the bed-frame is pushed outwardly out of alignment with the lower-main-body-frame and one of the sides is lowered to provide a platform. In this manner, there is provided ample head room and floor space.

For purposes of illustration, our invention is herein applied to a two-wheel trailer intended to be drawn by a motor vehicle. However, this is not to be considered a limitation of the invention as it may apply to a four-wheel trailer or to the chassis of the motor vehicle itself or applied to an animal drawn vehicle.

Our highly developed system of roads has made it possible for the average individual to reach the mountains, the streams, the lake, the rivers and the oceans and enjoy camping, fishing, hunting and swimming. The greatest drawback to the enjoyment of these sports has been the lack of comfortable quarters. To overcome this difficulty, we have created a cottage on wheels which has practically all the comforts of a home without sacrificing road comfort and without increasing the dangers of road travel. It is also our aim to overcome many of the objectionable features found in the present type of vehicle belonging to this art.

The controlling object of our invention is to provide a home on wheels adaptable for use upon the highways and conforming with all the statutes and regulations relative to the use of highways and which is stable, light in weight, compact and portable and which contains the major conveniences of a home.

An equally important object of our invention is to provide a vehicle having a low center of gravity, which holds to the road without reducing its traveling speed and which has a minimum of sidewise movement while traveling on the road.

Another object of our invention is to provide simple units or parts that are used in connection with the vehicle when it is being arranged for living quarters which can be easily disassembled, folded and stored into a very small amount of space.

Still another object of our invention is to provide attachments without complicated connections which can be attached and detached, folded and unfolded with a slight amount of physical exertion.

A further object of our invention is to provide rigid and weather proof lower and upper-main-body-frames which may have semi-rigid metal insect netting, transparent panes, curtains, shades, awnings or the like.

A very important object of our invention is to provide accommodations for cooking, refrigerating, washing and storage space within the lower-main-body-frame.

Another object of our invention is to provide a bed-frame and upper-main-body-frame which are cooperatively secured to each other but are adapted for movement in different directions relative to the lower-main-body-frame.

A further object of our invention is to provide ample and thoroughly sheltered sleeping quarters having adequate dressing room adjacent thereto wherein an individual can stand erect while dressing.

A still further object of our invention is to provide a kitchenette having the conveniences of running water, refrigeration and storage space for storing away dishes, cooking utensils, clothing and other accessories.

Another object of our invention is to provide a side wall which can be lowered to form a compartment for use as a dining, living or as a sleeping compartment when so desired.

A very important object of our invention is to provide a construction so simple and convenient that one person can set up or take down the detachable and/or movable parts without undue exertion.

A further object of our invention is to provide simple means for raising and lowering the upper-main-body-frame.

The invention is directed to other objects and possesses other features of novelty and advantage and consists in the new and useful provision, formation, construction, combination and interrelation of parts, members and features, all of which will be more apparent from the following detailed description, having reference to the accompanying drawings which illustrate one embodiment by which the invention may be realized, and in which:

Figure 1 is a front, elevational view of our invention in erected position ready for occupancy and indicates the relationship between the various elements which make up the invention. Portions are broken away in order to show more graphically some of the mechanism.

Figure 2 is a side, elevational view of our invention in its collapsed position ready for travel showing the position of the upper-main-body-frame with respect to the lower-main-body-frame.

Figure 3 is a top, plan view of the bed-frame which forms a part of our invention and shows, in cross section, a portion of the mechanism utilized in raising and lowering the upper-main-body-frame.

Figure 4 is a fragmentary, side view, partially in section, of the bed-frame-runners showing the position of the roller casters relative to the runners.

Figure 5 is a fragmentary, front, elevational view, partially in section, of the uprights and bracing-members used in our invention to maintain the door and screen frames in fixed position relative to the horizontally extended side-wall and to the top of the upper-main-body-frame, portions being broken away to show the manner of connecting the various elements to each other.

Figure 6 is a fragmentary, side view, partially in section, of a novel bracket taken on line 6—6 of Figure 5, looking in the direction indicated, the same being secured to the uppermost portion of the upright to which the door is hinged.

Figure 7 is a side, elevational view of our invention in erected position ready for occupancy with the canopy removed for the purpose of showing the position of the various elements which make up the invention and to show the skeleton frame work over which the canopy or covering is placed.

Figure 8 is a fragmentary, elevational view of a part of the raising and lowering mechanism, taken on line 8—8 of Figure 3, looking in the direction indicated.

Figure 9 is a sectional, end view of one of the rail members, taken on line 9—9 of Figure 1, looking in the direction indicated, and showing the position of one of the runners relative thereto.

Like reference characters refer to corresponding parts throughout the several views.

The invention before us, as will have been gathered from the foregoing and as will presently appear, is concerned not only with improvements in construction, but also with improvements in design of vehicles of this class. The vehicle, according to our invention, has a platform 1 which constitutes, in part, the floor. The platform is reinforced in any well known or customary manner and, therefore, need not be described in detail herein. The platform 1 is mounted upon any suitable type of running gear such as an axle which is transversely disposed relative to the platform, rubber-tired-wheels 3 and 4 rotatably disposed about the axle and springs 5 which are secured to the platform in any suitable fashion. The platform is positioned fairly low and is underslung relative to the running gear. The platform supports a light but rigid lower-main-body-frame designated generally by the reference character A. The lower-main-body-frame has vertically extending walls 7, 8, 9 and 10. All of these are of an equal height, but side-wall 7 is hinged to the side of the platform 1 by suitable hinges which, it is thought, need not be described. This side-wall 7 is adapted to swing outwardly and form an extension of the platform 1 as shown at 11 and constitutes a part of the floor when the vehicle is prepared for occupancy. To insure rigidity of the side-wall 7, when it is used as a floor and in order to prevent the possibility of the wall being sprung, there are provided a plurality of bracing-members 12, 13, 14, 15, 16 and 17 which are secured to the outside of the side-wall 7.

To maintain the vehicle in a substantially horizontal position when it is detached from the automobile or other drawing means and in order to prevent the vehicle from tilting about the axle, there are provided a plurality of adjustable-supports 18, 19 and 21 which are hingedly secured at each corner of the platform. Identical supports 29 and 30 are hingedly secured to the side-wall 7 which retain the side-wall in substantially horizontal position when the wall is in lowered position. Each of the adjustable supports is comprised of members 22 and 23. Member 22 is hingedly secured to the platform and has a dovetailed-groove 24 longitudinally disposed therein and member 23 has a dovetailed-ledge 25 longitudinally disposed therein as well as a slot 26. Members 22 and 23 are clamped relative to each other by any suitable means, as by threaded-bolt 27 and threaded-nut 28.

When the vehicle is ready for the road, supports 18, 19, and 21 are locked relative to the platform and supports 29 and 30 are locked relative to the side-wall respectively by any suitable means, as by retaining-clips 31.

Any suitable form of coupling may be employed for the purpose of connecting our vehicle to an automobile or other motor vehicle. For the purpose of illustration, reference character 32 indicates a standard which is rigidly secured to the platform 1 and extends outwardly from the front end thereof. A coupling 33 is secured to the front end of the standard and acts as a reinforcing member therefor. For the purposes of protecting each end of the vehicle against possible contact with the road due to its uneven surface, a roller 34 is adjustably positioned relative to the front end of the vehicle. The roller is disposed about shaft 35 which is journaled within brackets 36 and 37 that are in turn journaled to the platform or to the standard. Brace 38, having a plurality of openings 39, is journaled relative to the platform or to the standard and is adapted to be connected to one of the brackets by any suitable means as by, a bolt 40 which fits into any one of the openings 39.

A similar roller 41 having identical adjusting mechanism is secured at the rear end of the vehicle in any desirable manner.

A tank 42 is secured to the rear-wall 10 and has a cover 43 thereabout and a vestibule 44 is formed at the front-wall 8. A plurality of fluid-tanks 45 are connected to a central distribution 46 and are disposed in the vestibule 44. The distribution is connected to a stove which will be presently described.

Disposed upon the platform 1, between the walls 8 and 10 and adjacent wall 9, are a plurality of drawers 47, bins 49 and a refrigerator 50. These are all built rigidly inside of the lower-main-body-frame. A stove 51 is fixedly secured adjacent the wall 8 and is in spaced relationship with bin 49. A water-basin or sink 52 is disposed adjacent the wall 10 and is in spaced relationship with the drawers 48 and refrigerator 50. A drain board 53 is disposed adjacent the water-basin 52 and has thereunder a number of compartments 54 shown in dotted line position in Figure 7. By placing the basin, drain board and compartments in spaced relationship with the drawers and refrigerator, an aisle is created which affords ample standing room and clearance for opening the refrigerator doors and drawers. The water-faucet 55 is disposed in direct alignment with the water-basin and is connected in an obvious manner to the tank 42 in order to permit the flow of water from the faucet into the sink when desired. The water is made to flow by forcing air into the tank in any well known manner.

Bed-frame-rail-members 56 are secured to the wall 8 and similar bed-frame-rail-members 57 are secured to the wall 10. These bed-frame-rail-members are in parallel alignment with each other and extend substantially transversely of the walls 8 and 10. These bed-frame-rail-members are also disposed in spaced relationship with the refrigerator, bin, drawers, water-basin and stove. Bed-frame-runner 58 is adapted to ride within the bed-frame-rail-member 57 and bed-frame-runner 59 is adapted to ride within bed-frame-rail-member 56. Each of these runners has a plurality of roller-casters 60 disposed on each side thereof which facilitate the movement of the runners within the bed-frame-rail-members.

The bed-frame is designated generally by the reference character B and comprises not only the runners 58 and 59 but also longitudinal-members 61 and 62 disposed in spaced relationship to each other and between the runners. Cross-members 63 and 64 are disposed in spaced relationship to each other and to the runners between the longitudinal-members and brackets 65, 66, 67 and 68 assist in insuring rigidity of the bed-frame B. A suitable spring, mattress and other desirable bedding, not shown, may be placed upon the bed-frame.

Vertical-guide 69 is secured to runner 58 and vertical-guide 70 is secured to runner 59. Each of the guides has a longitudinal-slot 71 disposed therein. Braces 72 and 73 are secured to the guides and to the runners in order to maintain the guides in vertical position. While only two guides are shown, it is obvious that additional guides might be employed if desired. The purpose of these guides will be presently described.

Rotatably secured to one end of the bed-frame is a cable-drum 74 having gear-wheel 75 at one end thereof. Shaft 76 is journaled in parallel alignment with the drum and has pinion 77 secured thereto which is at all times in mesh with the gear-wheel 75. At the end of shaft 76 is a pin 78 adapted to interlock with a standard type of crank (not shown) used for rotating the drum. Locking-pawl 79 is disposed in registerable alignment with pinion 77 and is adapted to prevent the unwinding of the drum. Secured to and adapted to be wound around the drum are any suitable flexible means, as cables 80 and 81. Cable 80 is placed around pulleys 82 and 83 and cable 81 is placed around pulleys 84 and 85. The free-end 86 of cable 80 is secured to end 87 of shaft 88. The end 89 of cable 81 is secured to the lower end of shaft 90. Each of shafts 88 and 90 has a longitudinal-ledge 91 which is adapted to ride within slot 71. The shafts are adapted to vertically slide relative to and within the guides.

There is also provided in our invention an upper-main-body-frame designated generally by reference character C. The upper-main-body-frame comprises of downwardly-extending-walls 92, 93 and 94 and a top 95. Shafts 88 and 90 are secured to and braced relative to the top 95 by brackets 96 and 97 and angle-iron 98. Walls 92, 93 and 94 have window-openings 99. As many windows as desired may be provided and the windows may be covered by any suitable material, but preferably with metal netting 100 to permit the passage of air, but exclude insects. Standard-awnings 101 are disposed about each of the windows and not only assist in keeping the inside cool but also act as an ornamentation. The walls 92, 93 and 94 are of sufficient height to overlap the walls 8, 9 and 10 of the lower-main-body-frame, when the upper-main-body-frame is elevated to its full distance. In this manner the appearance and effect of a solid body is obtained.

Figure 1 effectively shows the position of the upper-main-body-frame when elevated the full distance relative to the lower-main-body-frame and to the outwardly extended bed-frame.

It has already been stated that wall 7 is hinged to the plaform 1 and may be extended to form a continuation of the floor as shown in Figure 1. In order to utilize the space thus created and to increase the accommodations without sacrificing privacy there is provided a retaining-wall 102 which is hingedly secured to the free end of wall 7 and is adapted to swing inwardly. Clips 103 that are secured to uprights 104 and 105 assist in retaining wall 7 in erect position. Uprights 104 and 105 are disposed at oppositely disposed corners of the side-wall and are removably secured thereto by any suitable means, as by dowl-pins 106.

Figures 5 and 6, in part, and Figure 7 illustrate the manner of assembling the frame work which forms the skeleton for the enclosure adapted to surround the extended side-wall 7. As is illustrated in Figure 5, each of the uprights 104 and 105 has a plurality of dowl-pins 106 downwardly extending from its base which fit into recesses 107 disposed at the corners of the side-wall and each of the uprights also has a plurality of dowl-pins 108 upwardly extending from its upper portion. A second group of uprights 109 and 110 are disposed at each end of the side-wall in spaced relationship with the uprights 104 and 105 and are secured to the base of the wall 7 by dowl-pins 111 disposed within recesses 112; but these uprights, instead of having dowl-pins upwardly extending from their upper portions, have retaining-brackets 113 and 114 extending outwardly therefrom. The purpose of these brackets will be presently related. Intermediate between uprights 104 and 105 and removably secured to the upper portion of the retaining-wall 102 is still another upright 115 which is secured to the retaining-wall 102 by any suitable means, as by band 116 into which fits wedge 117. Standards 118 and 119 are hingedly secured to the upper portion of the upright 115, and form a groove 120 when extended at right angles to the upright.

Standards 118 and 119 are secured to uprights 104 and 105 by having the dowl-pins 108 inserted therein as indicated in Figure 5. Standards 121 and 122 are removably secured to the top 95 by any suitable means, as by retaining-hooks 123, 124, 125 and 126. These standards extend throughout the entire length of the top and are indirectly connected with standards 118 and 119 by braces 127, 128 and 129. Brace 127 has a retaining-loop 130 at one end and a retaining-loop 131 at the other end. Retaining-loop 130 intimately fits around the end 132 of standard 121 and retaining-loop 131 intimately fits around the end 133 of standard 118. Retaining-bracket 113 fits around brace 127 as shown at 134. In this manner, uprights 104 and 109 are maintained in relatively fixed vertical positions. Brace 129 also has a retaining-loop 135 at one end and a retaining-loop 136 at the other end. Retaining-loop 135 intimately fits around the end 137 of standard 122 and retaining-loop 136 intimately fits around the end 138 of standard 119. Retaining-bracket 114 fits around brace 129 as shown at 139. In this manner, uprights 105 and 110 are maintained in relatively fixed vertical positions. Brace 128 is disposed between brace 127 and 129 and has a retaining-loop 140 at one end and a retaining-hook 141 at the other end. Retaining-loop 140 is adapted to lock the end 142 of standard 121 and the end 143 of standard 122 together. The retaining-hook 141 intimately fits into groove 120 and fixedly holds the upright 115 vertically.

From the foregoing, it will be seen that we have created a simple but rigid skeleton frame in which the members cooperate to reinforce and maintain each other in fixed position relative to the side-wall 7, maintaining-wall 102 and top 95. A canopy 144 made of any material, such as canvas or drill, is removably secured to the braces 127 and 129, to the retaining-wall 102 and to standards 121 and 122 thus forming a tent-like enclosure over the side-wall 7.

A frame 145, covered by any suitable material, as by wire-netting 146, is removably secured to and between upright 109 and wall 8 of the lower-main-body-frame by any suitable means, as by clips 147 and 148. A similar frame is disposed upon the oppositely disposed side of wall 7 and is removably secured to and between upright 110 and side-wall 10 by identical clips. Another frame 149, covered by netting 150 is removably secured to and between upright 109 and wall 92 of the upper-main-body-frame and also to the wall 8 of the lower-main-body-frame by any suitable means, as by clips 151 and 152. A similar frame is disposed upon the oppositely disposed side of wall 7 and is removably secured to and between upright 110, side-wall 94 and side-wall 10 by identical clips.

A door 153 is hingedly secured to upright 109 and is covered by netting 154. A similar door 153 is hingedly secured to upright 110. This completes the description of the manner in which a complete and protective enclosure for the vehicle is formed when the wall 7 is extended.

A plurality of fasteners 155 are disposed around the frames, windows and doors. These fasteners are adapted to receive any protective covering, such as cover 156, which has proper fastening means disposed therein. Cover 156 may be made either of transparent or of opaque material depending upon the whim of the user. In this manner, the doors, frames and windows may be covered to prevent the entry of wind or cold.

In order to lock the upper-main-body-frame to the lower-main-body-frame and in order to lock the side-wall 7 relative to both of the body-frames, there are provided any suitable locking means, as locking-latches 157 and 158 which are hingedly secured to side-wall 7 at opposite ends thereof, and which interlock with receiving-hooks 159 and 160 that are secured to side-wall 94 and 92 respectively. There are also provided locking-latches 161 and 162 which are secured to the wall 7 and which enter the top 95.

*Modus operandi*

In preparing the vehicle for the road, the upper-main-body-frame C is telescoped over the lower-main-body-frame A after the bed-frame B has been placed into proper alignment with the lower-main-body-frame as shown in Figure 2.

When it is desired to make the vehicle ready for occupancy, the upper-main-body-frame C is arranged to be raised relative to the lower-main-body-frame A from the position shown in Figure 2 to the position shown in Figure 1.

In order to make the vehicle, shown in Figure 2 ready for occupancy and expanded to the position shown in Figure 1, the supports and the locking-latches are removed from their respective fastenings and the wall 7 is outwardly extended to form a continuation of the platform. After this is completed and the supports are properly aligned with the ground to prevent the tilting of the vehicle upon its axle, the upper-main-body-frame is raised to its full distance. Then the bed-frame is moved outwardly carrying with it the upper-main-body-frame, since they are attached to each other. The retaining-wall is then moved upwardly to its vertical position and the uprights are placed in their respective positions. The frames, then, are secured to the uprights and side-walls of the upper and lower-main-body-frames, and the braces are secured to the top and to the uprights. The canopy is then placed over the braces. In this manner the vehicle is erected to the position shown in Figure 1. To make the vehicle ready for travel, as shown in Figure 2, the steps outlined above are reversed.

It is evident from the foregoing that our invention provides advantages and complete touring accommodations including comforts of a home.

The invention has been described in connection with a specific illustrative embodiment disclosing a definite arrangement of parts. However, it will be understood that many variants thereof are possible to those skilled in the art, and the invention, in its broader aspect, is not limited to the specific construction herein described and shown, as changes in the size, proportions, configurations, arrangements, assemblage, materials, juxtaposition and mechanical relations, as well as additions, omissions, substitutions, combinations, interrelations and alterations of forms, parts, members and features, may be made without departing from the broad spirit of this invention.

Having thus disclosed our invention, what we claim as new and upon which we desire to secure Letters Patent is:

1. The combination with a vehicle having running gear, of a platform, a plurality of walls encircling the platform, one of the side-walls adapted to swing outwardly and form a continuation of the platform, a bed-frame disposed in spaced relationship with the platform and slidably movable relative thereto whereby the bed-frame may be extended beyond the other of the side-walls and give access to a portion of the platform, means for limiting the outward travel of the bed-frame, an upper-main-body-frame secured to the bed-frame adapted for vertical and horizontal travel, the means for limiting the outward travel of the bed-frame being adaptable for raising and lowering the upper-main-body-frame.

2. A bed-frame and an upper-main-body-frame to be used with a vehicle of the class described, comprising a pair of runners disposed in spaced relationship and parallel to each other, guides vertically secured to each of said runners, said guides having longitudinal-slots therein, T-shaped shafts slidably disposed within the guides, an upper-main-body-frame secured to the upper portions of the shafts, said upper-main-body-frame comprising a top, two end-walls and a side-wall and means for vertically moving the T-shaped shafts relative to the guides.

3. In a device of the class described, in combination, a lower-main-body-frame disposed upon running-gear, a bed-frame slidably disposed relative to the lower-main-body-frame, an upper-main-body-frame secured to the bed-frame and adapted to be raised and lowered relative to the main-body-frame, a side-wall hingedly secured to and adapted to form a continuation of the platform of the lower-main-body-frame, a retaining-wall hingedly secured to the free end of the side-wall, a plurality of uprights secured to the side-wall and to the retaining-wall, a plurality of standards secured to the upper-main-body-frame and to the uprights, a plurality of braces disposed therebetween, a plurality of frames removably secured to the walls of the upper and lower-main-body-frames and to the uprights, a door hingedly disposed at each side of the hinged side-wall a canopy for covering the uprights and braces, a pair of guides vertically secured to the bed-frame, said guides having longitudinal slots therein, and T-shaped shafts slidably disposed within said guides.

4. In a device of the class described, the combination with a lower-main-body-frame disposed upon running-gear, a bed-frame in spaced relationship with and slidably disposed relative to the lower-main-body-frame, a side-wall hingedly secured to the lower-main-body-frame and adapted to form a continuation of the platform of the lower-main-body-frame, an upper-main-body-frame slidably secured to the bed-frame and adapted for vertical travel relative thereto and the main-body-frame, and for horizontal travel relative to the lower-main-body-frame, a pair of guides secured to the bed-frame and T-shaped shafts secured to the upper-main-body-frame and slidably disposed within said guides.

BEN LEVY.
HAROLD J. HANSON.